(12) United States Patent
Parnin et al.

(10) Patent No.: US 11,193,422 B2
(45) Date of Patent: *Dec. 7, 2021

(54) LUBRICATION SYSTEM FOR GAS TURBINE ENGINES

(71) Applicant: United Technologies Corporation, Farmington, CT (US)

(72) Inventors: Francis Parnin, Suffield, CT (US); Paul H. Dolman, Simsbury, CT (US); David M. Daley, Manchester, CT (US); Denman H. James, West Hartford, CT (US); Richard W. Clark, Jensen Beach, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 366 days.

This patent is subject to a terminal disclaimer.

(21) Appl. No.: 16/167,048

(22) Filed: Oct. 22, 2018

(65) Prior Publication Data
US 2019/0055886 A1 Feb. 21, 2019

Related U.S. Application Data

(63) Continuation of application No. 13/690,767, filed on Nov. 30, 2012, now Pat. No. 10,107,197.

(51) Int. Cl.
*F02C 7/06* (2006.01)
*F01D 25/20* (2006.01)

(52) U.S. Cl.
CPC .............. *F02C 7/06* (2013.01); *F01D 25/20* (2013.01); *F05D 2270/301* (2013.01);
(Continued)

(58) Field of Classification Search
CPC ...... F01D 25/16; F01D 25/165; F01D 25/162; F01D 25/18; F01D 25/20; F02C 7/06;
(Continued)

(56) References Cited

U.S. PATENT DOCUMENTS 2,578,275 A    12/1951   Whiteman
4,378,677 A    4/1983   Zumstein
(Continued)

FOREIGN PATENT DOCUMENTS

EP            1505278 A2     2/2005

OTHER PUBLICATIONS

EPSR for EP Application No. 13858861.1 (EP2925974) Issued Jun. 16, 2016. (8 pgs).

(Continued)

*Primary Examiner* — Jason H Duger
(74) *Attorney, Agent, or Firm* — Cantor Colburn LLP

(57) ABSTRACT

A lubrication system is disclosed. The lubrication system may be used in conjunction with a gas turbine engine for generating power or lift. The lubrication system utilized a flow scheduling valve which reduces lubricant flow to at least one component based on an engine load. The lubrication system may further include a main pump which may be regulated by an engine speed. Thus, a lubrication system which provides a lubricant to engine components based on the load and speed of the engine is possible. The system may improve efficiency of the engine by reducing the power previously spent in churning excess lubricant by at least one engine component as well as reducing the energy used by a lubricant cooler in cooling the excess lubricant. The lubricant cooler size may also be minimized to reduce weight and air drag due to the reduced lubricant flow.

14 Claims, 4 Drawing Sheets

(52) U.S. Cl.
   CPC .. *F05D 2270/304* (2013.01); *F05D 2270/331* (2013.01); *F05D 2270/332* (2013.01); *F05D 2270/335* (2013.01); *Y02T 50/60* (2013.01)

(58) Field of Classification Search
   CPC ..... F02C 7/14; F02C 7/32; F02C 7/36; F01M 2250/62; F01M 2001/123; F05D 2260/98; F05D 2270/301; F05D 2270/304; F05D 2270/331; F05D 2270/332; F05D 2270/335
   See application file for complete search history.

(56) References Cited

U.S. PATENT DOCUMENTS

| | | | |
|---|---|---|---|
| 4,380,146 A | 4/1983 | Yannone et al. | |
| 5,067,454 A * | 11/1991 | Waddington | F01D 25/20 |
| | | | 123/196 S |
| 5,307,865 A | 5/1994 | Inagaki et al. | |
| 5,339,776 A | 8/1994 | Regueiro | |
| 6,058,694 A * | 5/2000 | Ackerman | F01D 25/18 |
| | | | 184/6.11 |
| 6,459,963 B1 | 10/2002 | Bennett et al. | |
| 7,506,724 B2 | 3/2009 | Delaloye | |
| 7,886,875 B2 | 2/2011 | Shevchencko et al. | |
| 8,261,527 B1 * | 9/2012 | Stearns | F02C 7/224 |
| | | | 60/39.08 |
| 8,424,646 B2 | 4/2013 | Parnin et al. | |
| 2001/0047647 A1 | 12/2001 | Cornet | |
| 2003/0155183 A1 * | 8/2003 | Nonaka | F01D 25/16 |
| | | | 184/6.23 |
| 2004/0216445 A1 | 11/2004 | Jones et al. | |
| 2007/0031238 A1 | 2/2007 | Fujii et al. | |
| 2008/0006483 A1 * | 1/2008 | Parnin | F01D 25/20 |
| | | | 184/6 |
| 2010/0107600 A1 * | 5/2010 | Hillel | F02C 9/18 |
| | | | 60/235 |
| 2010/0294597 A1 | 11/2010 | Parnin | |
| 2011/0147322 A1 * | 6/2011 | Payne | F16N 39/06 |
| | | | 210/805 |
| 2012/0167581 A1 | 7/2012 | Pesce et al. | |
| 2012/0234014 A1 | 9/2012 | Reuter et al. | |
| 2014/0150439 A1 | 6/2014 | Parnin et al. | |

OTHER PUBLICATIONS

International Search Report and Written Opinion for related International Application No. PCT/US13/68275; report dated Jun. 11, 2014.

* cited by examiner

LUBRICATION SYSTEM FOR GAS TURBINE ENGINES

CROSS REFERENCE TO RELATED APPLICATIONS

This application is a continuation of U.S. patent application Ser. No. 13/690,767 filed on Nov. 20, 2012, the disclosure of which is incorporated by reference herein in its entirety.

FIELD OF THE DISCLOSURE

The present disclosure generally relates to gas turbine engines and, more specifically, to the lubrication systems of gas turbine engines.

BACKGROUND OF THE DISCLOSURE

Gas turbine engines of modern aircraft require a supply of oil to mechanical components such as, but not limited to, bearings, seals, and the like. The oil can be used as a lubricant, a coolant, or both for these components. Typical oil systems supply the oil to a manifold which then directs the oil to different engine components. In some systems, the oil then progresses to a tank for holding the oil before it is pumped back to the components to lubricate them again. In other systems, the oil is simply pumped back to the engine components and stored in a sump at each component. When the oil leaves the tank it is filtered to remove unwanted debris and de-aerated to remove any air absorbed by the oil while lubricating and cooling the components. An oil cooler also removes additional heat gained from the lubricated components. Commonly, the fuel for the engine is used as the coolant, as the fuel moves quickly in relation to the oil allowing the fuel to absorb a large amount of heat from the oil. Other lubrication systems may have the filter, de-aerator, or cooler arranged in the system such that the oil interacts with these components after leaving the engine components but before returning to the tank or sump.

In prior art oil systems, the quantity of oil pumped to the components is typically based on a high speed and high load condition, or is regulated based on the speed of the engine. However, either approach often results in an oversupply of oil, at least in low load conditions, such as during cruise or a high altitude climb, for example. This reduces the efficiency of the engine in that the excess oil is churned by the engine component, imparting extra heat to the lubricant. This lubricant then needs to be cooled before being used as a coolant or lubricant for the engine components again and thereby drawing power from the engine. Additionally, the bulky coolers needed for cooling the oil increase the weight of the engine, and in turn weight of the aircraft, thereby reducing fuel economy. In light of the foregoing, it can be seen that an oil system is needed that can provide oil in the quantity needed under the specific load and speed conditions the engine is experiencing.

SUMMARY OF THE DISCLOSURE

In accordance with one aspect of the disclosure, a lubrication system for a gas turbine engine is disclosed. The lubrication system may include a main pump which may move a lubricant through a main conduit from a lubricant tank to an engine component. The system may further include a flow scheduling valve positioned in the main conduit between the main pump and the engine component. The flow scheduling valve may limit lubricant flow to the engine component based on a calculated load of the gas turbine engine and redirect excess lubricant through a return conduit to the lubricant tank.

In a refinement, the lubrication system may further include a lubricant cooler connected to the main conduit.

In a further refinement, the cooler may be positioned between the main pump and the engine component.

In another refinement, the lubrication system may further include a fixed flow metering orifice positioned in the main conduit between the main pump and the engine component. The metering orifice may allow lubricant to bypass the engine component via a bypass conduit and return to the lubricant tank.

In another refinement, the engine load is calculated by a processor from a combustor pressure.

In yet another refinement, the engine load is calculated by a processor from a fan speed measured by a speed sensor.

In yet another refinement, the main pump may be regulated by an engine speed.

In yet another refinement, the lubrication system may further include a manifold positioned in the main conduit between the main pump and the flow scheduling valve. The manifold may be connected to the engine component via a side conduit. The side conduit may allow the engine component to receive lubricant flow not reduced by the flow scheduling valve.

In accordance with another aspect of the disclosure, a gas turbine engine is disclosed. The gas turbine engine may have an engine component requiring lubrication and further include a compressor, a combustor, a turbine, a lubrication tank, a main conduit, and a flow scheduling valve positioned in a main conduit between the lubricant tank and the engine component. The valve may limit a flow of lubricant from the lubricant tank to the engine component based on a load on the engine component. The valve may also redirect excess lubricant through a return conduit to the lubricant tank.

In a refinement, the lubrication system may further include a main pump connected to the main conduit. The main pump may pump lubricant from the lubricant tank to the engine component.

In a further refinement, the main pump may be driven by a drivetrain mechanically connected to an engine rotor.

In another refinement, the load on the engine component may be calculated by a processor based on a parameter measured by a pressure sensor and/or speed sensor.

In another refinement, the gas turbine engine may further include a lubricant cooler.

In yet another refinement, the gas turbine engine may further include a manifold positioned in the main conduit between the lubricant tank and the flow scheduling valve. The manifold may be connected to the engine component via a side conduit. The manifold may also allow the engine component to receive a flow of lubricant not reduced by the flow scheduling valve.

In accordance with yet another aspect of the disclosure, a method of lubricating a component of a gas turbine engine is disclosed. The method may include pumping a lubricant from a lubricant tank through a main conduit to an engine component by a main pump, calculating a load condition of the engine, and limiting the flow of the lubricant to the engine component by a flow scheduling valve. The flow limitation may be based on the calculated load condition of the engine.

In a refinement, the method may further include directing excess lubricant from the flow scheduling valve though a return conduit to the lubricant tank by way of the flow scheduling valve.

In another refinement, the method may further include measuring an engine combustor pressure and calculating the load on the engine by a processor based on the combustor pressure.

In another refinement, the method may further include measuring a fan speed and calculating the load on the engine by a processor based on the fan speed.

In yet another refinement, the method may further include regulating lubricant flow from the main pump based on an operating speed of the gas turbine engine.

In yet another refinement, the method may further include redirecting lubricant from the main conduit through a bypass conduit to the lubricant tank.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
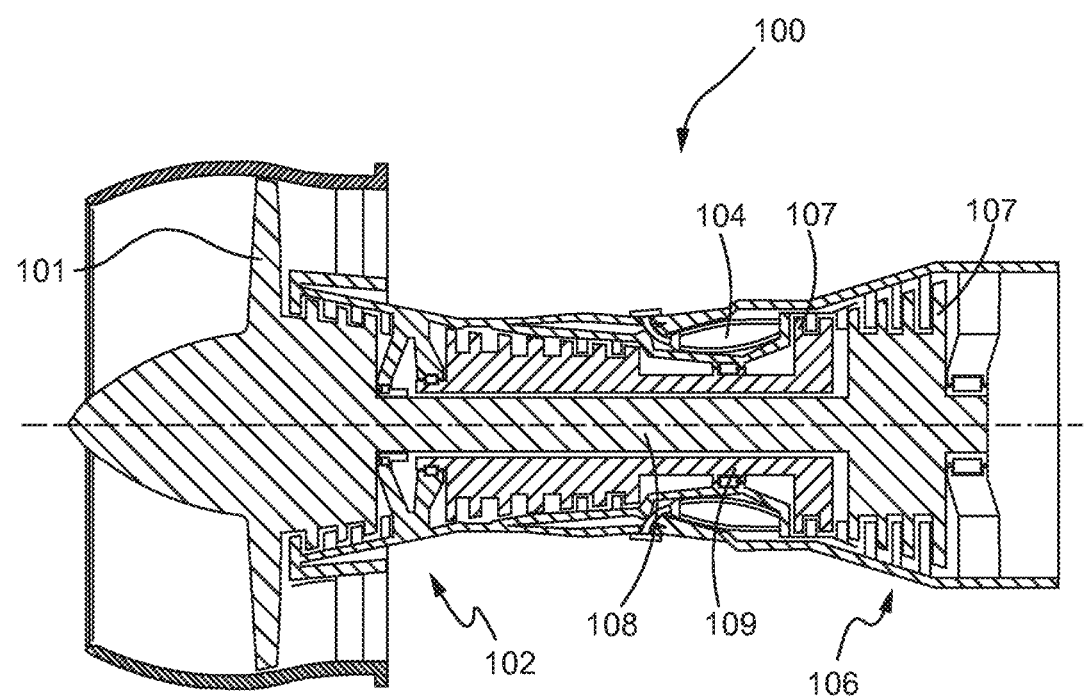
FIG. 1 is a side view of a gas turbine engine built in accordance with the present disclosure.

Referring now to the drawings and with specific reference to FIG. 1, a gas turbine engine 100 is shown. The engine 100 may include a fan 101, a compressor section 102, a combustor 104, and a turbine section 106 axially aligned through the engine. The fan 101 may draw in ambient air which may then be compressed by the compressor section 102, having a low and high pressure compressor. The now compressed air may be used in the combustor 104 as a coolant and as a reactant in the combustion process. The exhaust from the combustion process may exit the combustor 104 and move through the turbine section 106, causing the turbine section 106 to rotate. The turbine section 106, having a high and low pressure turbine, includes a plurality of blades 107 connected to a pair of rotating shafts 108 and 109 which are concentrically mounted, shaft 109 around shaft 108, and are in turn connected to the fan 101 and compressor section 102. Accordingly, when the turbine section 106 rotates so do the fan 101 and the corresponding compressors of the compressor section 102. As the exhaust exits through the turbine section 106, new ambient air is brought in and compressed by the fan 101 and the compressor section 102 to continue the cycle. While the compressor and turbine sections have been described and illustrated as a dual-spool configuration, it should be understood that any configuration of compressors and turbines are possible, such as, but not limited to, single or triple spool compressors or turbines.

Figure 2:
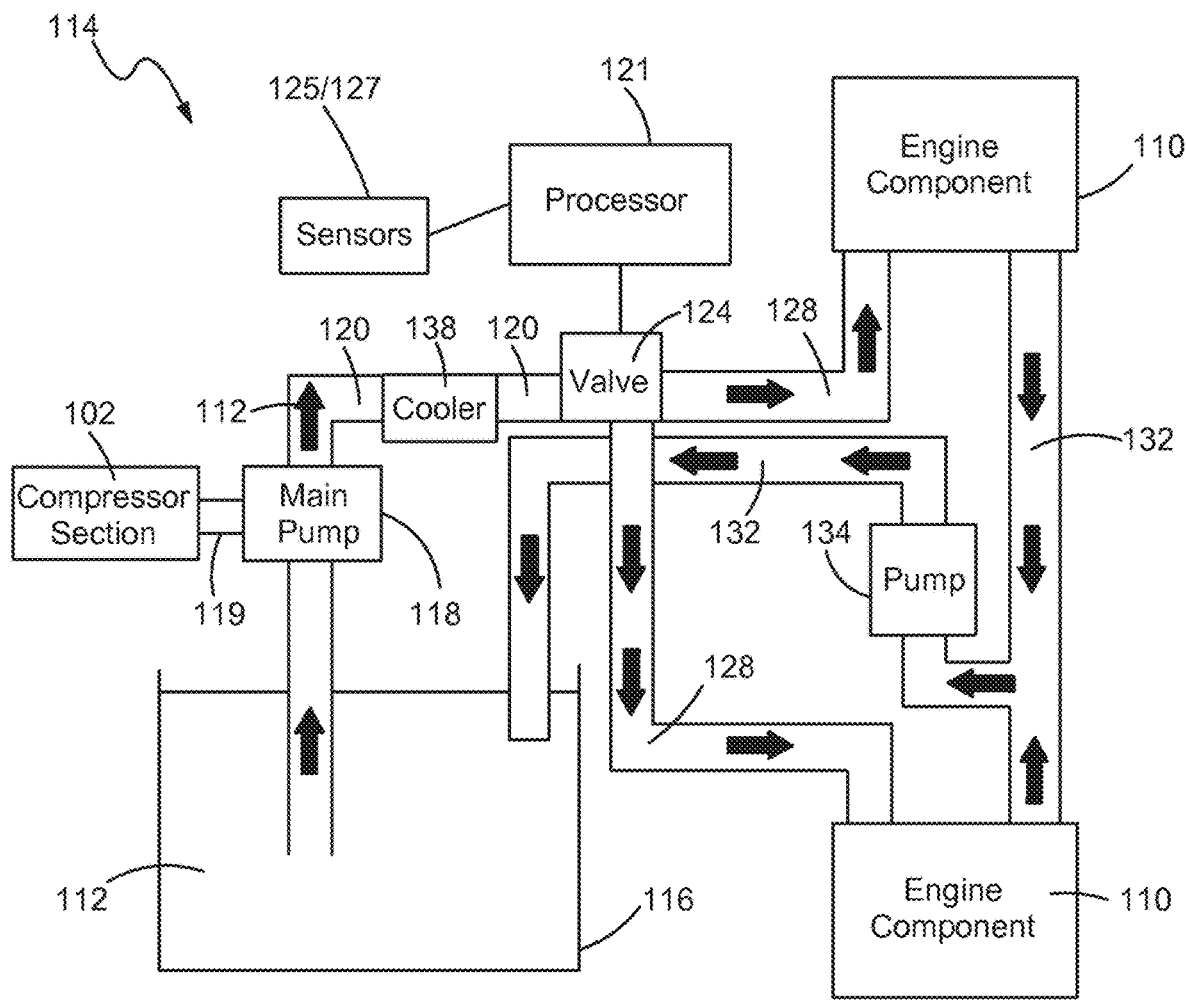
FIG. 2 is a flow diagram of an oil lubrication system built in accordance with the present disclosure.

Referring now to FIG. 2, the engine 100 may have at least one component 110 which needs a lubricant 112, such as an oil, to reduce friction and act as a coolant. The engine component 110 may be an engine gearbox, a shaft bearing, or the rotating shafts 108 and 109, but other engine components are possible. The lubricant 112 may be moved to each engine component 110 through a lubrication system 114.

The lubrication system 114 may include a lubricant tank 116 or sump for storing the lubricant when not being used by the engine components 110. The lubrication system 114 may have a main pump 118 to draw a constant supply of lubricant 112 from the lubricant tank 116 through a main conduit 120. Alternatively, the main pump 118 may draw a varying supply of lubricant 112. The main pump 118 may be mechanically driven by a drivetrain 119 in mechanical connection with an engine rotor, such as the compressor section 102 as in FIG. 2, to regulate the flow of lubricant 112 according to an operational speed of the engine 100. Alternatively, the main pump 118 may be regulated by a processor 121 to regulate the flow of lubricant 112 according to an operational speed of the engine 100, as in FIG. 3.

The lubrication system 114 may have a main conduit 120 from the main pump 118 to the engine component 110. The main pump 118 may pump the lubricant 112 through the main conduit 120 to each component 110. A flow scheduling valve 124 is positioned in the main conduit 120 between the main pump 118 and the engine component 110, such as the engine gearbox.

The flow scheduling valve 124 may regulate the flow of lubricant 112 directly from the main pump 118 to at least one component 110 such that all such components 110 may receive a reduced flow of lubricant 112 based on a calculated engine load. The engine load may be calculated by the processor 121 from any suitable parameter such as, but not limited to, a combustor pressure, a fan speed, an engine horsepower, or the like. The combustor pressure may be measured by a pressure sensor 125 in the combustor 104 and the fan speed may be measured by a speed sensor 127, for example. As the engine load decreases, the processor 121 may direct the valve 124 to reduce the flow of lubricant 112 to the engine component 110 by an equivalent percentage.

The lubrication system 114 may also have a scavenge conduit 132 from each of the components 110 to the lubricant tank 116 for returning the used lubricant 112 to the lubricant tank 116. At least one scavenge pump 134, for pumping lubricant 112 from the components 110 to the lubricant tank 116, may be provided in connection with the scavenge conduit 132.

A lubricant cooler 138 may be positioned in the main conduit 120 or in the scavenge conduit 132 and may remove heat gained from the engine component 110 from the lubricant 112. The lubricant cooler 138 may operate by allowing compressed air or fuel to draw heat from the lubricant 112 through at least one wall of the lubricant cooler 138 or by any other known method. Additionally, a lubricant filter (not shown) and/or a de-aerator (not shown) may also be positioned in the main conduit 120 or the scavenge conduit 132. The lubricant filter may remove unwanted debris from the lubricant 112, such as coked lubricant, for example. The de-aerator may separate unwanted air entrained in the lubricant 112 which may have been combined while the lubricant 112 acted on the engine component 110.

The lubrication system 114 described above may be further modified as in FIG. 3. Many elements are similar to the embodiment of FIG. 2, but it will be noted that a manifold 122 may be positioned between the main pump 118 and the flow scheduling valve 124 in the main conduit 120. The manifold may direct a portion of the lubricant 112 through a side conduit 123 to a first engine component 110. Thus, the engine component 110 may receive a flow of lubricant 112 not reduced by the flow scheduling valve 124. Additionally, the flow scheduling valve 124 may redirect any excess lubricant 112 through a return conduit 126 to the lubricant tank 116. The main conduit 120 between the flow scheduling valve 124 and the engine component 110 may have a primary conduit 128 which accepts the full flow of lubricant 112 exiting from the flow scheduling valve 124. At least one secondary conduit 130 branching from the primary conduit 128 may also be provided. Each secondary conduit 130 may lead to another engine component 110 and be constructed to receive a pre-determined percentage of the total lubricant 112 from the flow scheduling valve 124.

Figure 3:
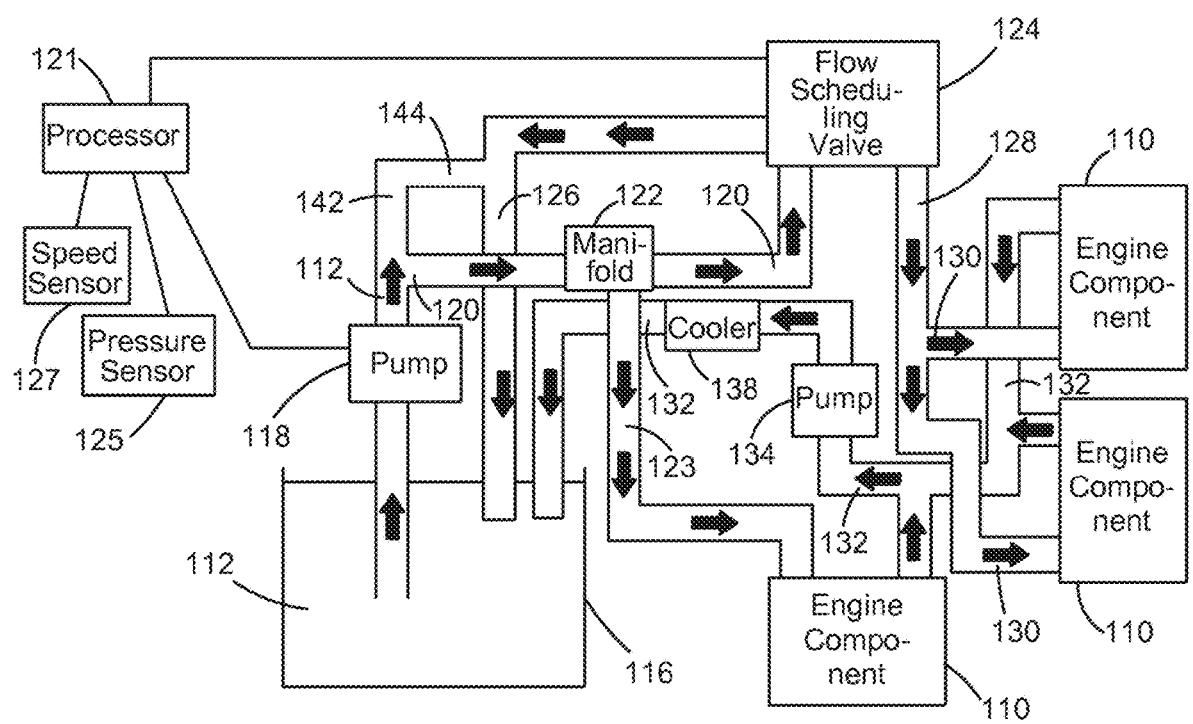
FIG. 3 is a flow diagram of an oil lubrication system built in accordance with the present disclosure and depicting a manifold and a fixed flow metering orifice.

Further in FIG. 3, a fixed flow metering orifice 142 may be positioned in the main conduit 120 between the main pump 118 and the engine components 110. The metering orifice 142 may allow a constant percentage of the lubricant 112 to bypass the entire lubrication system 114, which may prevent the lubricant 112 from backing up in the main conduit 120. The metering orifice 142 may allow this excess lubricant 112 to return to the lubricant tank 116 by a bypass conduit 144. Alternatively, a regulating valve may also allow the lubricant to bypass the lubrication system in a similar manner.

Figure 4:
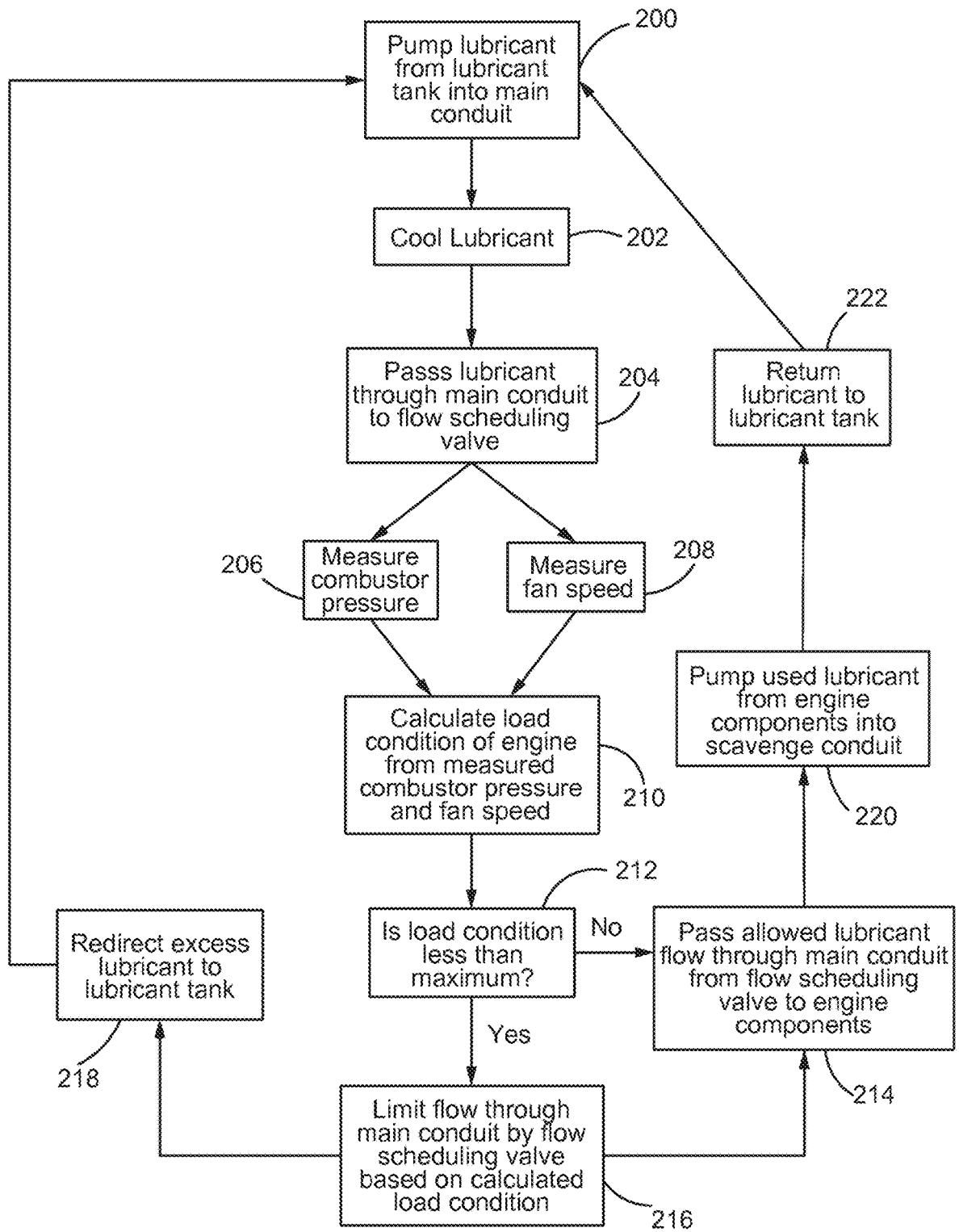
FIG. 4 is a flow chart depicting a sample sequence of steps which may be undertaken in accordance with the method of the present disclosure.

In operation, it can therefore be seen that the lubrication system 114 is able to lubricate the gas turbine engine 100 according to the method depicted in FIG. 4. As depicted, at a first step 200 the main pump 118 pumps lubricant 112 from the lubricant tank 116 into the main conduit 120. The lubricant is passed through the main conduit 120 to a lubricant cooler to remove excess heat from the lubricant which may have been gained by previously acting on engine components 110, as in a step 202. The cooled lubricant is then passed to the flow scheduling valve 124, as shown by a step 204.

The pressure of the combustor 104 and speed of the fan 101 are then both measured by sensors in the engine 100 as shown by steps 206 and 208, respectively, and a load condition of the engine 100 is calculated from the measured values at a step 210. If the load condition is at a maximum as determined by a step 212, all of the lubricant 112 is allowed to pass through the flow scheduling valve 124 as shown at a step 214. However, if the load condition is less than maximum the lubricant flow is reduced by the valve 124 as at step 216. In such a case, excess lubricant 112 is then redirected back to the lubricant tank at a step 218, while a reduced amount of lubricant 112 is passed through the valve 124. In this embodiment, all lubricant 112 passing the valve 124 flows through the main conduit 120 to the engine component 110, where the lubricant 112 lubricates or removes heat from the component 110.

Whether the engine is operating at a maximum, minimum, or anywhere in between, after passing through the flow scheduling valve 124, the used lubricant 112 is pumped from the engine components 110 into a scavenge conduit 134 at a step 220. The lubricant 112 is returned through the scavenge conduit 134 to the lubricant tank 116 at a step 222. Once the lubricant 112 reaches the tank 116 it is once again pumped into the main conduit 120 by the main pump 118.

INDUSTRIAL APPLICABILITY

From the foregoing, it can be seen that the lubrication system disclosed herein has industrial applicability in a variety of settings such as, but not limited to lubricating and cooling gas turbine engines. The lubrication system may increase the efficiency of the engine by reducing energy consumption which would heretofore have been spent on churning excess lubricant during low load conditions. The lubrication system may also increase the efficiency of the engine by reducing the necessary cooling of the lubricant and thus minimizing the size of the lubricant cooler. Minimizing the size of the lubricant cooler may reduce weight of the engine and/or air drag, further improving performance.

While the present disclosure has been in reference to a gas turbine engine, one skilled in the art will understand that the teachings herein can be used in other applications as well. It is therefore intended that the scope of the invention not be limited by the embodiments presented herein as the best mode for carrying out the invention, but that the invention will include all embodiments falling within the scope of the claims.

What is claimed is:

1. A lubrication system for a gas turbine engine having a fan and a combustor, the system comprising:
    a main pump, a flow scheduling valve, and a main conduit fluidly connecting the main pump and the flow scheduling valve, the main pump moving a lubricant through the main conduit from a lubricant tank to the flow scheduling valve,
    a first engine component fluidly connected by a first primary conduit to the flow scheduling valve, a second engine component fluidly connected by a second primary conduit to the flow scheduling valve, wherein the main pump moves the lubricant to the flow scheduling valve; and
    a processor connected to the flow scheduling valve and at least one sensor that the processor provides at least one measured value, the processor configured to:
        receive the at least one measured value from the at least one sensor,
        calculate an engine load based on the at least one measured value,
        selectively control the flow scheduling valve to proportionally reduce flow of the lubricant to both the first engine component and the second engine component in response to detecting a reduced value of the calculated engine load, and
    wherein the at least one sensor includes one or both of a pressure sensor providing a measured pressure of the combustor and a speed sensor providing a measured speed of the fan, and wherein the at least one measured value includes the corresponding one or both of the measured pressure and the measured speed; and
    wherein the at least one sensor includes both of the pressure sensor providing the measured pressure of the combustor and the speed sensor providing the measured speed of the fan, and wherein the at least one measured value includes the corresponding both of the measured pressure and the measured speed.

2. The lubrication system of claim 1, further comprising a lubricant cooler connected to the main conduit.

3. The lubrication system of claim 2, wherein the lubricant cooler is positioned between the main pump and the flow scheduling valve.

4. The lubrication system of claim 1, further comprising a fixed flow metering orifice allowing the lubricant to bypass the first engine component and the second engine component via a bypass conduit and to return to the lubricant tank.

5. The lubrication system of claim 1, further comprising a manifold positioned in the main conduit between the main pump and the flow scheduling valve, the manifold being connected to a third engine component via a side conduit to allow the engine component to receive a portion of the lubricant not reduced by the flow scheduling valve.

6. The lubrication system of claim 1 further comprising a first scavenge conduit fluidly connecting the first engine component and the second engine component to each other and to the lubricant tank.

7. A gas turbine engine comprising:
a fan and a combustor, and
a lubrication system, the lubrication system comprising:
a lubrication tank;
a main conduit in fluid communication with the lubrication tank;
a main pump, a flow scheduling valve, and the main conduit fluidly connecting the main pump and the flow scheduling valve, the main pump moving a lubricant through the main conduit from the lubricant tank to the flow scheduling valve,
a first engine component fluidly connected by a first primary conduit to the flow scheduling valve, a second engine component fluidly connected by a second primary conduit to the flow scheduling valve; and
a processor connected to the flow scheduling valve and at least one sensor that provides at least one measured value, the processor configured to:
receive the at least one measured value from the at least one sensor,
calculate an engine load based on the at least one measured value,
selectively control the flow scheduling valve to proportionally reduce flow of the lubricant to both the first engine component and the second engine component in response to detecting a reduced value of the calculated engine load, and
wherein the at least one sensor includes one or both of a pressure sensor providing a measured pressure of the combustor and a speed sensor providing a measured speed of the fan, and wherein the at least one measured value includes the corresponding one or both of the measured pressure and the measured speed; and
wherein the at least one sensor includes both of the pressure sensor providing the measured pressure of the combustor and the speed sensor providing the measured speed of the tars, and wherein the at least one measured value includes the corresponding both of the measured pressure and the measured speed.

8. The gas turbine engine of claim 7, wherein the main pump is driven by a drivetrain.

9. The gas turbine engine of claim 7, further comprising a lubricant cooler connected to the main conduit.

10. The gas turbine engine of claim 7, further comprising a manifold positioned in the main conduit between the lubricant tank and the flow scheduling valve and connected to a third engine component via a side conduit, the manifold allowing the third engine component to receive a portion of the lubricant not reduced by the flow scheduling valve.

11. The gas turbine engine of claim 7, further comprising a first scavenge conduit fluidly connecting the first engine component and the second engine component to each other and to the lubricant tank.

12. A method of lubricating a first component and a second component of a gas turbine engine, the gas turbine engine having a fan and a combustor, comprising:
moving a lubricant through a main conduit from a lubricant tank to a flow scheduling valve by a main pump, the main conduit fluidly connecting the main pump and the flow scheduling valve,
fluidly connecting the first component to the flow scheduling valve with a first primary conduit,
fluidly connecting the second component to the flow scheduling valve with a second primary conduit,
moving the lubricant to the flow scheduling valve with the main pump, and
providing at least one measured value from at least one sensor to a processor, the processor connected to the flow scheduling valve and the at least one sensor,
calculating an engine load with the processor based on the at least one measured value,
regulating the main pump with the processor to selectively control the moving of the lubricant through the main conduit from the lubricant tank to the flow scheduling valve according to an operational speed of the gas turbine engine,
selectively controlling the flow scheduling valve with the processor to proportionally reduce flow of the lubricant to both the first component and the second component in response to detecting a reduced value of the calculated engine load with the processor, and
wherein the at least one sensor includes one or both of a pressure sensor providing a measured pressure of the combustor and a speed sensor providing a measured speed of the fan, and wherein the at least one measured value includes the corresponding one or both of the measured pressure and the measured speed; and
wherein the at least one sensor includes both of the pressure sensor providing the measured pressure of the combustor and the speed sensor providing the measured speed of the fate and wherein the at least one measured value includes the corresponding both of the measured pressure and the measured speed.

13. The method of claim 12, further comprising directing an excess portion of the lubricant through a return conduit to the lubricant tank.

14. The method of claim 12, further comprising redirecting a portion of the lubricant from the main conduit through a bypass conduit to the lubricant tank.

* * * * *